United States Patent Office 2,756,845
Patented July 31, 1956

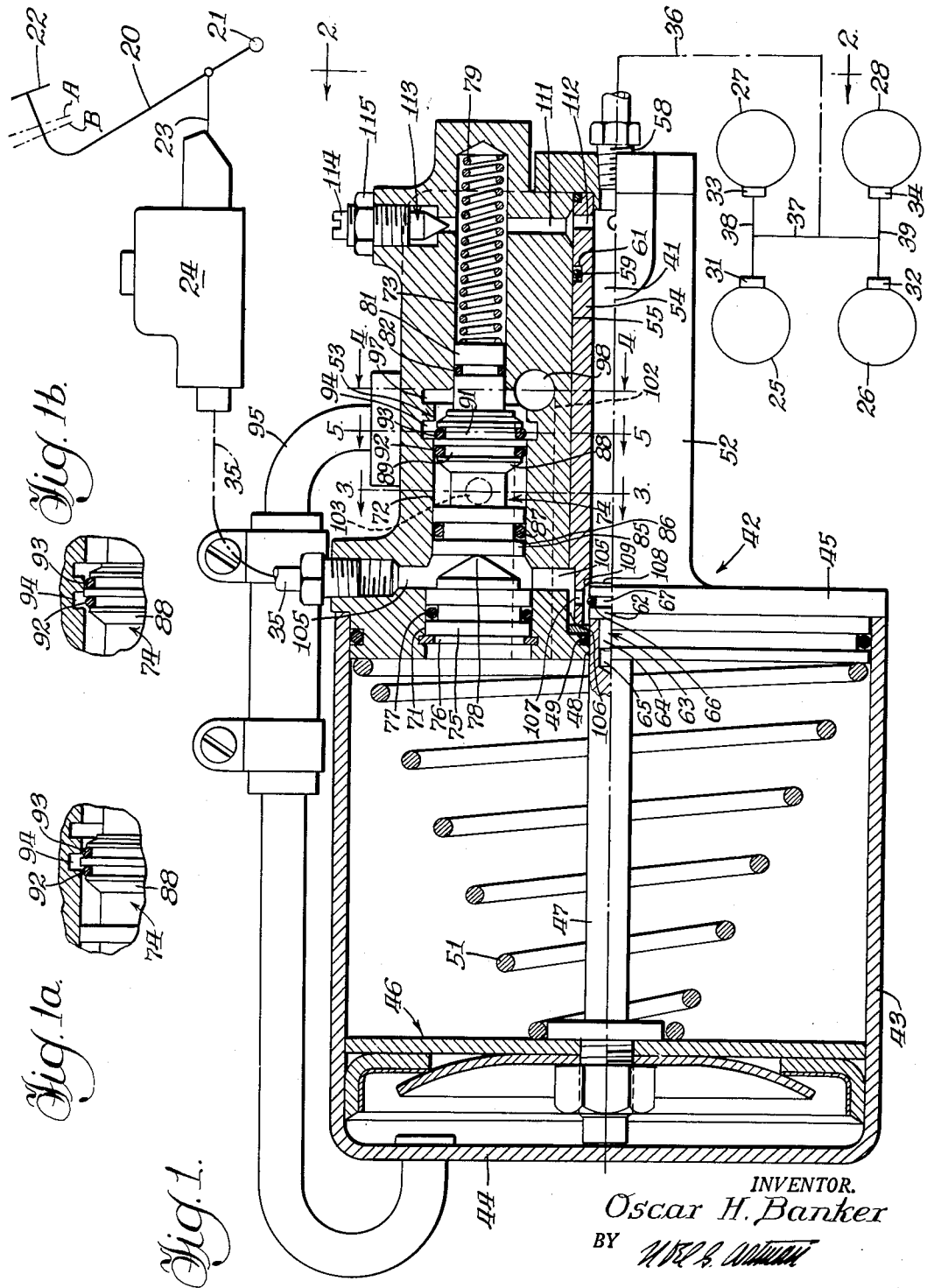

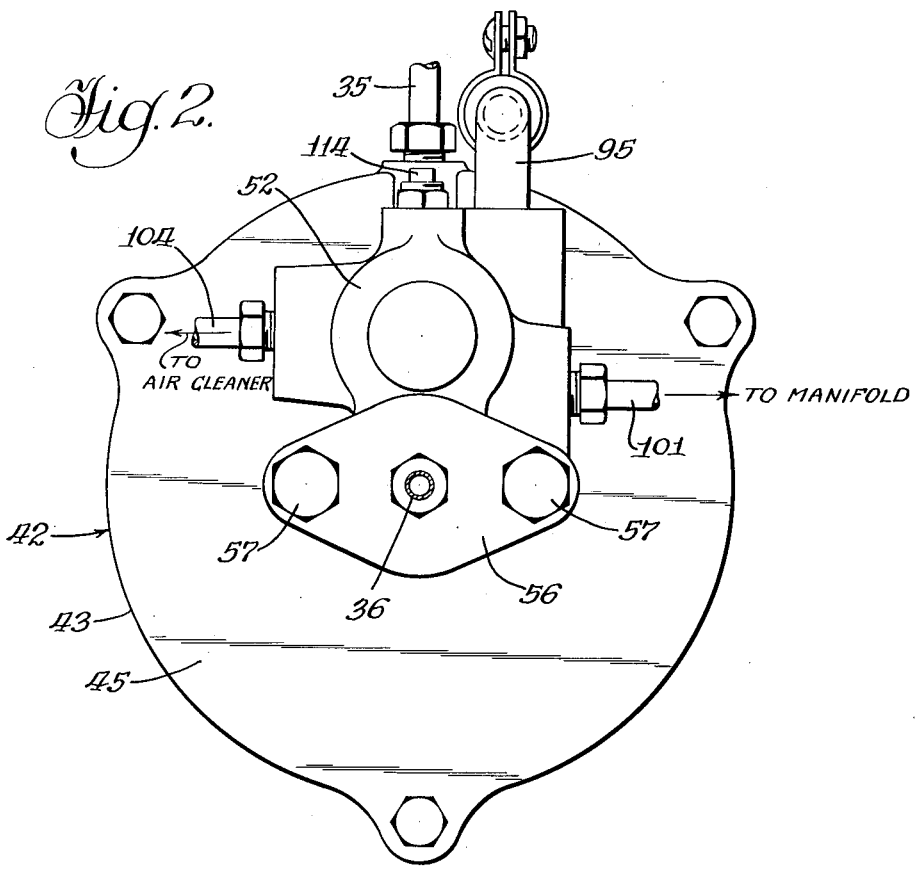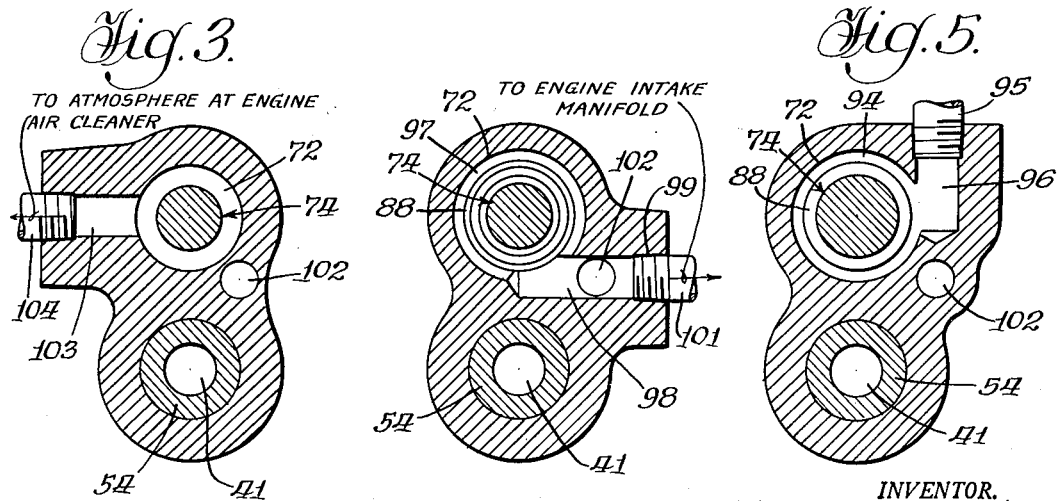

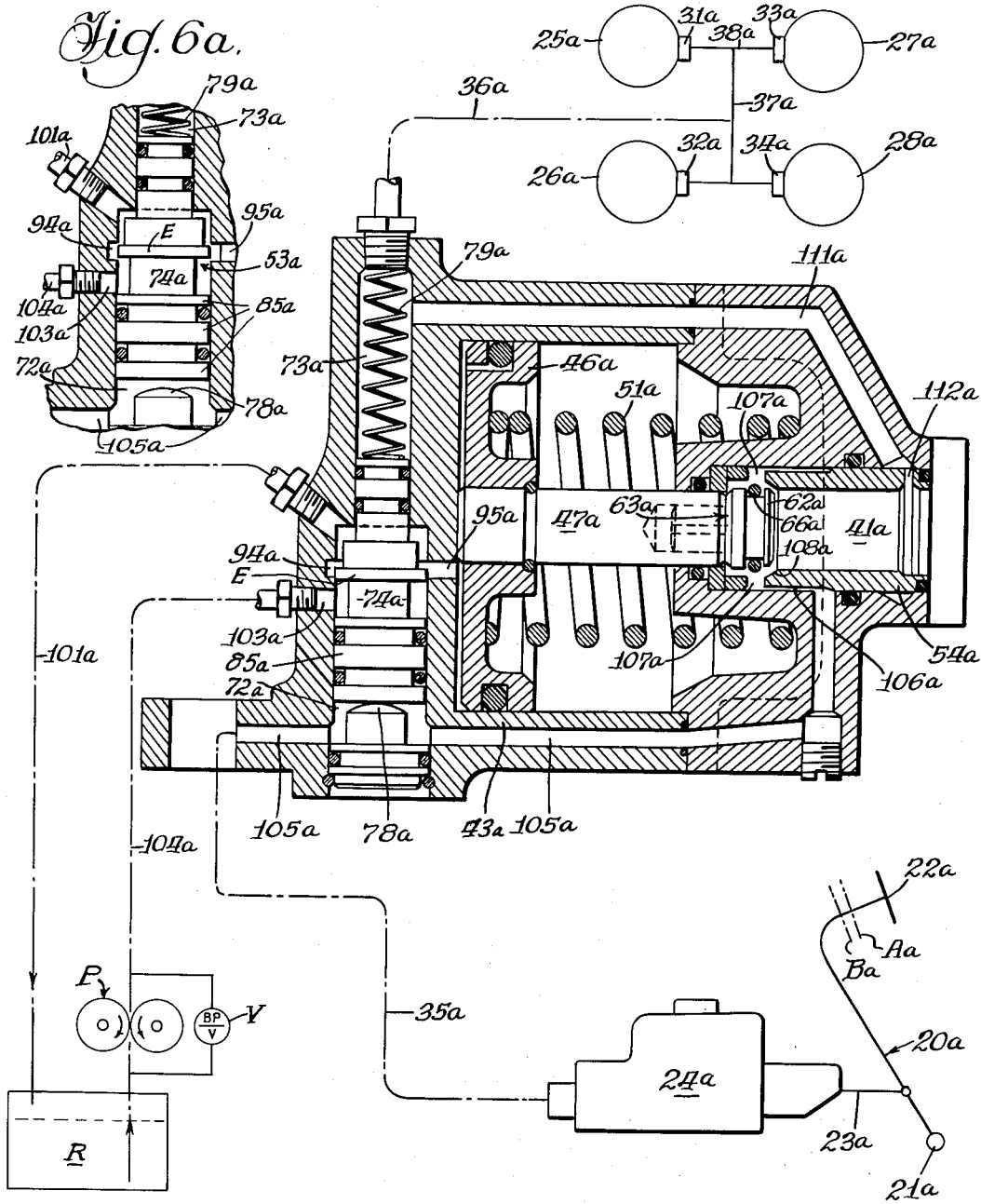

2,756,845

POWER-OPERATED BRAKING SYSTEM WITH POTENTIAL MANUAL OPERATION

Oscar H. Banker, Evanston, Ill., assignor to New Products Corporation, Chicago, Ill., a corporation of Delaware Application February 1, 1951, Serial No. 208,951

12 Claims. (Cl. 188—152)

This invention has to do with power-operated braking systems and more particularly concerns such a system wherein a quantity of operating fluid for filling the supply lines and pulsators of hydraulic brakes is derived from a manually-operated master cylinder to initially engage the friction elements of the brakes, whereupon a power-operated fluid compressing unit becomes effective to increase the pressure in the lines and pulsators to produce braking action in accordance with additional pressure incurred manually in the master cylinder. The term "manual" is used herein with the now popular connotation which includes an operator's feet or other anatomical parts through which an operating force is exerted, as well as his hands.

In conventional manually-operated hydraulic braking systems for automotive vehicles the brake pedal pad has an operating range of about six inches between its release position and the toe board of the driver's compartment. With the type of driving requiring frequent application of brakes considerable driver's fatigue is incurred by lifting his foot the six inches or so from the floor for engaging the pedal pad in addition to energy required for exerting force of as much as 200 pounds on the pedal to obtain maximum braking action. It has been recognized that a worthwhile increase in driver's comfort and conservation of his energy could be obtained by a power braking system diminishing the amount of force necessarily applied to the pedal and also by decreasing the amount of pedal travel to within a range substantially corresponding to that of the accelerator pedal, that is, approximately three inches from the released position of the pedal pad to the toe board of the driver's compartment. There would be no need for the driver to lift the heel of his foot from the floor to engage such a pedal for depressing, and subsequent to engagement of the pedal the driver can simply flex his ankle for determining the pedal pressure.

A principal problem that has prevailed in the design of a power-operated braking system controllable by a pedal requiring substantially diminished operator's pressure and an operating range of approximately three inches has been the cost of the necessary equipment. A factor unfavorably influencing the cost of power-operated braking systems heretofore employed has been the use of the power-operated pressure creating unit to contain the entire volume of displaceable operating fluid for the brakes. This required that the power-operated unit have a large displacement capacity. Such displacement capacity has necessarily been of a volume to first move the friction elements of the brakes from a retracted position into an engaged position, plus an additional volume necessary to fully engage the brakes at a pre-determined maximum pressure, plus an additional volume necessary to move the friction elements a further distance to take up the slack after they have become worn, plus an additional volume to effect still further movement of the brake elements in the event of their having been subjected to a series of repeated brake engagements causing heat expansion of the brake drums. For the power operating unit to provide the maximum contemplated line pressure (1400 lbs. per sq. in.) leading to the brakes and still be operable to displace the necessary amount of fluid, the pressure-creating plunger and bore therefor in the pressure unit has necessarily been of a long stroke design so that its diameter would not require pressure in excess of that attainable in a moderate size vacuum cylinder or a fluid pressure cylinder operable at pressures attainable by virtue of a connection with the engine intake manifold or with a pressure lubricating system of the vehicle. Despite the long stroke design enabling the device to develop the required brake line pressure from pressure differential sources available on the vehicle, the size of the booster units has necessarily been so large as to incur a cost discouraging a customer demand justifying commercial production.

The space factor of these rather bulky pressure boosters in prior power braking systems has been a further impediment to their acceptance. Finding space for attachment of bulky equipment on the modern accessory-equipped vehicle is difficult.

A primary object of this invention is the provision of an improved brake operating system wherein means is provided for manual supply of brake operating fluid from a master cylinder through the brake lines to the brake operating pulsators for taking up the space between the friction elements, together with means thereupon causing further delivery of fluid into the brake lines from a power-operated unit which may therefore possess only the displacement capacity for increasing the pressure in the already filled lines, making it possible to use a pressure chamber having an extremely small bore for a plunger of moderate stroke, whereby a relatively small pressure booster unit is capable of developing the required brake energizing pressure from pressure attainable either from the engine lubricating system or from the atmosphere when a chamber of the unit is evacuated through a connection with the engine intake manifold.

A further object of this invention is the provision of a power brake-operating system according to the preceeding object wherein means is provided for reflecting a diminished pressure correlated with the brake line pressure back through the master cylinder to the brake pedal for manifesting the degree of brake engagement to the operator.

A further object is the provision of a power-operated braking system wherein an initial slack take-up quantity of fluid is introduced into the brake lines from a master cylinder, whereupon, in response to further pressure developed in the master cylinder, additional fluid for causing brake engagement is derived from a fluid pressure creating unit in accordance with increments of pressure manually applied to a pedal in control of the master cylinder, together with means for replacing fluid into the master cylinder in accordance with increase of pressure in the brake lines whereby the master cylinder plunger and the brake pedal will be returned substantially to a predetermined position following each increment of manual pressure. This feature of the brake pedal not advancing beyond essentially a pre-determined limit, in contrast to being depressed further according to increased manual pressure for intensifying brake engagement, makes it practical to provide for a limited operating range for the pedal pad.

Another object is the provision of a brake operating system which is normally manually operable to create a brake line pressure for initially engaging the brake friction surfaces and to thereafter cause power application of the brakes, but which system is operable in the event of power failure to cause further manual engagement of the brakes in response to additional pressure on the brake pedal.

Still a further object is the provision of a braking system which is power operated following an initial manual operation pursuant to which the brake lines and brake pulsators are filled by fluid displaced from a master cylinder in response to depression of a brake pedal, whereby the operator can detect the amount of brake wear according to the distance the pedal must be depressed before power operation commences.

The above and other desirable objects inherent in and encompossed by the invention will become more readily apparent from the insuing description, the appended claims and the annexed drawings, wherein:

Fig. 1 is a view partly diagrammatic illustrating a preferred form of the invention, a fluid compressing unit and a pressure piloted control valve therefor being shown in longitudinal section.

Fig. 1a is a fragmentary sectional view illustrating the control valve in a neutral position for maintaining a pressure status in the fluid compressing or booster unit.

Fig. 1b is a view similar to Fig. 1a, illustrating the control valve in position to cause energization of the fluid compressing unit by permitting introduction of air thereinto at atmospheric pressure while a sub-atmospheric pressure condition is caused to prevail in a portion of the unit by communication with the intake manifold of the vehicle engine.

Fig. 2 is an end elevational view of the control valve and fluid compressing unit taken from the right end as indicated by the arrows associated with the line 2—2 in Fig. 1.

Figs. 3, 4, and 5 are transverse sectional views taken respectively upon the lines 3—3, 4—4, and 5—5 of Fig. 1.

Fig. 6 is a view partly diagrammatic illustrating a second embodiment of the invention adapted to be energized by liquid under pressure, the casing containing a fluid compressing unit and a pressure piloted control valve therefor, the casing being shown in section for illustrating fluid conducting passages and moveable parts within bores therein.

Fig. 6a is a fragmentary sectional view illustrating the plunger of the control valve in a dynamic fluid pressure balancing position for maintaining a desired degree of energization of the fluid compressing unit.

Referring now to Figs. 1 through 5 which illustrate the first embodiment of the invention, there will be seen a diagrammatically illustrated brake pedal 20 mounted on a fixed pivot 21 and having a pedal pad 22. A diagrammatically illustrated linkage 23 operably connects the brake pedal with the plunger (not shown) of a diagrammatically illustrated master cylinder 24 which may be of conventional construction. Diagrammatically illustrated brakes 25, 26, 27, and 28 having the conventional fluid operated pulsators 31, 32, 33, and 34 are adapted to having fluid introduced thereinto at an initial pressure through a fluid conducting passage including a conduit 35 leading from the master cylinder and brake pressure lines 36, 37, 38, and 39 which communicate between the brake pulsators and a pressure chamber 41 of a fluid compressing unit 42.

The fluid compressing unit 42 which is in the form of a pressure booster for intensifying pressure obtained from a pressure source has a pressure differential between atmospheric air and the diminished pressure zone of the intake manifold on the engine of a vehicle having the apparatus installed thereon, includes a cylinder 43 having opposite end walls 44 and 45. A piston 46 is moveable endwise in the cylinder 43 and is mounted on and piloted by a piston rod 47. The remote end of the piston rod with respect to the piston 46 projects into a bearing 48 in the cylinder end wall 45. An O-ring 49 forms a seal between the bearing opening 48 and the piston rod. The piston 46 and piston rod 47 are normally maintained in the retracted position shown by a large conical spring 51. An endwise projecting extension on the cylinder end wall 45 provides a casing 52 for the pressure chamber 41 and for a pressure operated control unit in the form of a control valve 53. The pressure chamber 41 is contained within a sleeve 54 inserted into a bore 55 of the casing 52 from the right end thereof as ilustrated in Fig. 1. The sleeve is held within the bore 55 by means of a closure cap 56 which is secured to the casing by cap screws 57, Fig. 2. A fitting 58 which is mounted in the cap 56 communicates between the chamber 41 and the conduit 36 which is secured to the cap by means of the fitting. Leakage of fluid endwise of the sleeve 54 between the exterior of such sleeve and the bore 55 is prevented by a sealing ring 59 received by a groove 61 circling the exterior sleeve.

The bore within the sleeve 54 forming the cylindrical side wall of the pressure chamber 41 has essentially the same diameter as an enlarged cylindrical section 62 of a plunger 63 having a small diameter end portion 64 piloted within a recess 65 in the remote end of the piston rod 47. Piston rod 47 is slightly smaller in diameter than the cylindrical pressure chamber 41 wherefor a substantial clearance will prevail between the wall of the pressure chamber and this piston rod when the latter is moved to the right as viewed in Fig. 1 for forcing the plunger 63 into the pressure chamber. An O-ring 66 in a circumscribing groove 67 of the plunger 63 is pressed against the cylindrical interior of the pressure chamber 41 to provide an effective seal between the plunger and the chamber wall when these parts are in telescopic relation. A stepped bore having coaxial sections 71, 72 and 73 of respective diameters diminishing in the other named is for accommodating the control valve plunger 74 which is axially moveable therein. Bore section 71 is closed by a plug 75 which is held against retraction by a snapring 76. A sealing ring 77 encircles said plug. A conical inner end 78 of the plug 75 provides a retraction stop for the plunger 74 which is moveable within the bore section 72 and urged against the stop 78 by a helical spring 79 contained within the bore section 73. A tail or reduced diameter section 81 of the valve plunger is piloted in the bore section 73 where leakage endwise of and between this plunger section 81 and the bore section 73 is prevented by an O-ring 82.

An enlargement 85 of the valve plunger 74 has a circumferential groove 86 containing an O-ring 87 to provide a seal between this enlargement and the bore section 72. A second enlargement 88 of the valve plunger contains two circumferential grooves 89 and 91 wherein there are sealing O-rings 92 and 93.

An annular port 94 circumscribing the interior of the bore section 72 communicates with a conduit 95 through a passage 96, Fig. 5, and this conduit communicates with the left end of the fluid compressing unit cylinder 43 as viewed in Fig. 1.

A second annular port, 97, at the right end of the valve bore section 72 and in coaxial relation therewith communicates with a short passage 98, Fig. 4, which has a threaded section 99 for the connection of a conduit 101 leading from the intake manifold (not shown) of the vehicle engine. A lateral passage 102, Figs. 1, 3, 4, and 5 leads from the passage 98 into the right end of the booster cylinder 43, Fig. 1, thereby providing continuous communication between the intake manifold and the low pressure end of the cylinder 43. A short passage 103, Fig. 3, and indicated by a dot-dash circle in Fig. 1, communicates at all times with a portion of the valve bore section 72 between the valve plunger enlargements 85 and 88, there being a conduit 104 to provide communication from the bore section 72 to the atmosphere through the engine air cleaner (not shown).

A vertical bore 105 in the casing 52 diametrically intersects the valve bore section 72 to provide communication between the master cylinder conduit 35 and a space 106 in the left end of casing bore 55. When the fluid compressing unit plunger 63 is retracted as illustrated in Fig. 1, the passage 105 communicates with the pressure chamber 41 through a circle of sleeve ports 107 of which one is shown in Fig. 1. This communication can prevail so long as the right end of the plunger 63 is spaced retractively from the small diameter edge 108 of a seat 109 in the left end interior of the pressure chamber sleeve 54. Such communication is precluded incident to advancement of the compressing unit plunger 63 for carrying the right end thereof into registry with the seat edge 108, and this preclusion of communication prevails pursuant to insertion of the plunger 63 into the pressure chamber bore 41. The plunger 63 and the edge 108 of the sleeve 54 therefore cooperate to provide a cut-off valve 62–108 operable to communicatively isolate the master cylinder 24 from the brake lines and pulsators. The O-ring 66 on the plunger 63 is guided into the pressure chamber bore 41 by the conical seat 109.

A vertical bore 111 intersects the valve bore section 73 and communicates at its lower end through a sleeve passage 112 with the pressure chamber 41. A bleed valve device 113 at the upper end of the bore 111 is adapted to be opened to facilitate complete filling of the apparatus with operating liquid, subsequent to which the needle element 114 will be tightened to close the valve and to be maintained tightened by a lock nut 115.

*Operation of the first embodiment*

The parts of the apparatus are illustrated in Fig. 1 in the positions they assume when the brake pedal 20 is released. It will be noted that the large helical spring 51 has returned and is maintaining the compressing unit piston 46 in its retracted position determined by the left end of the piston rod 47 butting against the cylinder end wall 44. The plunger 63 which retracts with the piston rod 47 has caused the cut-off valve 62–108 to be open. Valve spring 79 has retracted the valve plunger 74 leftward for butting its left end against the stop 78. This places the control valve 53 in condition for deenergizing the fluid compressing unit 43—46—47—63—54 by cutting off communication between the atmosphere (energy source) and the left end of the cylinder 43, and, concurrently establishes communication between such left end of the cylinder and the intake manifold, thereby establishing a sub-atmospheric pressure condition upon both ends of the piston 46. The cut-off of communication between the atmosphere and the left end of cylinder 43 occurs when the sealing ring 92 is disposed leftward of the annular port 94. In this manner communication is blocked between the atmospheric pressure passage 103 (leading to the atmosphere through the engine air cleaner) and the annular port 94 which communicates with the left end of cylinder 43 through the conduit 95. When the sealing ring 93 registers with the annular port 94 as illustrated in Fig. 1 the left end of cylinder 43 communicates through the conduit 95, port 94, annular low pressure port 97, passage 98, and conduit 101, Fig. 4, with the engine intake manifold. Since the lateral passage 102, Figs. 1 and 4, continuously communicates between the intake manifold and the right end of the cylinder 43, the cylinder sections at both ends of the piston 46 will then be at an equal low pressure according to the intake manifold pressure.

When the operator desires to effect braking of the vehicle he will press upon the pedal pad 22 and thereby operate the master cylinder 24 for expelling fluid therefrom through the conduit 35, passage 105, ports 107, cut-off valve 62–108, pressure chamber 41 and the brake lines 36, 37, 38, and 39 into the brake actuating pulsators 31 through 34. The spring 79 is sufficiently strong to maintain the valve plunger 74 leftward of the portion illustrated in Fig. 1a until enough fluid has been discharged from the master cylinder to fill and expand the pulsators 31 through 34 to cause an initial engagement or contacting of the friction surfaces of the brakes. When the brake pedal has been depressed to carry the pad 22 into position A, the brake pulsators 31 through 34 will be expanded as aforesaid and the pressure in the left end of the valve plunger bore section 72 will have attained a magnitude exerting sufficient pressure on the left end of the plunger 74 to have moved the plunger into the position illustrated in Fig. 1a against the force of the spring 79. While the valve plunger is in this position the sealing ring 93 will have cut-off communication between the low pressure port 97 and the port 94 communicating through the conduit 95 with the pressure end of the cylinder 43. This, however, has no effect since the spring 51 will continue to maintain the piston 46 at its retracted limit. But when additional manual pressure is applied to the pedal pad 22 for depressing it to postion B, for example, the master cylinder 24 will cause an additional quantity of fluid to enter the left end of the bore section 72 for moving the valve plunger into a fluid compressing unit energizing position illustrated in Fig. 1b to establish communication between the atmospheric pressure passage 103 and the cylinder-communicating port 94 whereupon air from the atmosphere will flow inwardly through the engine air cleaner and thence through the conduit 104, passage 103, past the sealing ring 92 into the port 94, and though conduit 95 into the left end of the cylinder 43, causing advance of the piston 46 against the force of the spring 51, to close the cut-off valve 62–108 and force the plunger 63 into the pressure chamber 41. This compresses the fluid in the chamber 41 thereby increasing the pressure in the brake lines and brake pulsators to frictionally engage the friction elements of the brakes for effected braking action. The increment of pressure in the pressure chamber 41 caused by the power-forcing of the plunger 63 thereinto is isolated from the master cylinder by the closed cut-off valve 62–108 wherefore the pressure required on the pedal pad 22 for maintaining this increment of pressure does not increase. However, a limit upon the degree of pressure increase in the chamber 41 is provided for by the transfer of this pressure through the passages 112 and 111 into the valve bore section 73 for acting upon the small diameter section 81 of the valve plunger to supplement the force of the spring 79 sufficiently for retracting the valve plunger into the Fig. 1a position. The sealing rings 92 and 93 then communicatively isolate the left end of the cylinder 43 from the atmospheric pressure passage 103 as well as from the subatmospheric pressure port 97 whereby the status quo in the position of the piston 46 and of the fluid pressure in the chamber 41 and in the brake pulsators 31 through 34 will obtain so long as there is no change in the force applied manually to the pedal pad 22. Incident to the valve plunger 74 being retracted from the fluid compressing unit energizing position, Fig. 1b, to the energizing-status-maintaining position of Fig. 1a this valve plunger expelled fluid from the valve plunger chamber backwardly through the conduit 35 into the master cylinder 24 to cause retraction of the pedal pad from position B to position A. This slight movement of the brake pedal pad from position B to position A occurs while the operator maintains the pressure on the pedal pad 22. In fact, this retractive movement of the pedal is so slight that the operator will normally not be conscious of it.

Should the vehicle operator desire to increase the amount of braking action he will instinctively increase the pressure on the brake pedal, thus moving it from position A to a more depressed position such as position B to increase the fluid pressure on the left end of the valve plunger 74 and thus prevail over the combined fluid and spring pressure applied to the right end of the valve plunger, thereby causing return of this plunger into Fig. 1b position. This re-establishes communication of the atmosphere with the left end of cylinder 43 to intensify energization of the fluid compressing unit.

Advancement of the piston 46 and of the fluid compressing plunger 63 follows to intensify the brake engagement and to establish a new dynamic balance of the valve plunger in the Fig. 1a position following transfer of additional fluid through the passages 112 and 111 into the bore section 73 at a higher pressure balancing the increased manual pressure of the master cylinder fluid on the left end of the valve plunger. Again the brake pedal pad 22 will be retracted to position A attendant to the readjustment of the valve plunger from the Fig. 1b position to the 1a position.

Inasmuch as the power-generated fluid pressure acting upon the right end of the valve plunger 74 has less plunger area on which to act than has the manually-generated pressure upon the larger left end area of this plunger, the manually-generated pressure will be less than the power-generated pressure but will be proportional thereto and will thus reflect through the master cylinder and the brake pedal a diminished pressure directly manifesting to the operator the intensity of braking.

The operator can decrease the intensive of braking to desired degree by diminishing the pressure upon the brake pedal pad for allowing it to retract from position A, thereby decreasing the hydraulic pressure transferred from the master cylinder to the left end of the valve plunger 74. When this occurs the hydraulic and spring pressure upon the right end of the valve plunger will retract this plunger for carrying the sealing ring 93 into registry with the port 94 permitting escape of air from the left end of the cylinder 43 through the conduit 95 into the port 97 and thence to the intake manifold and in part through the ducts 98 and 102 into the right end of the cylinder 43. The piston 46 is then forced to the left by the combined effect of fluid pressure in the chamber 41 and the large helical spring 51. This diminishes the pressure in the chamber 41 and in the brake pulsators 31 through 34. As this pressure diminishes together with the hydraulic pressure in the valve bore section 73, the force manually applied to the brake pedal pad 22 will be effective for advancing the pedal into position A attendant to hydraulically moving the valve plunger back into the position of Fig. 1a.

When the operator desires to completely release the vehicle brakes he will allow the brake pedal 20 to retract into the position illustrated in Fig. 1 whereupon the combined fluid and spring pressure on the right end of the valve plunger 74 will retract this plunger to the Fig. 1 position establishing communication between the subatmospheric pressure port 97 and the cylinder-communicating port 94 whereby both ends of the cylinder 43 are caused to communicate with the intake manifold and permit retraction of the plunger 63 and the piston 46 by the combined pressures of the fluid in the pressure chamber 41 and of the spring 51. The apparatus will then be in condition to be caused to effect a subsequent braking cycle.

Sensitivity of the control valve 53 to endwise movement of the valve plunger is increased by causing the axial spacing of the sealing rings from center to center to be only substantially the same dimension lengthwise of the bore 72 as the annular cylinder communicating port 94 so that these sealing rings will have no greater spacing than necessary to seal both edges of the port 94 when in the position illustrated in Fig. 1a. The amount of overlap of the rings 92 and 93 with the bore portions on opposite sides of the port 94 is slightly exaggerated in Fig. 1a. When the sealing rings have no excess overlap with the sections of the bore at opposite sides of the annular port 94 only slight movement of the valve plunger in either axial direction will incur instantaneous response to cause power movement of the fluid compressing unit piston 46 in accordance to which direction the valve plunger is caused to move.

*Description of second embodiment, Figs 6 and 6a*

The second embodiment of the invention operates upon the same general principle as the first embodiment and differs therefrom only in such structural details that adapt this embodiment for energizing the brake fluid compressing unit from a source of liquid under pressure instead of being energized by subjection to atmospheric pressure complementarily with a reduced pressure zone of the intake manifold for creating a pressure differential. Because of the similarity of the various components in the second embodiment to those in the first embodiment this description is expedited by simply designating these corresponding parts by the same respective reference characters of the first embodiment but with addition of the suffix "a." It is believed this embodiment of the invention will be fully understood from a description of its operating cycle.

*Operation of the second embodiment*

To cause engagement of the vehicle brakes 25a through 28a the operator will press upon the brake pedal pad 22a conventionally. During depression of the pedal pad from the position shown to the position Aa the master cylinder 24a expels fluid through the conduit 35a, passages 105a and 106a and ports 107a past the valve 62a–108a into the pressure chamber 41a. This displaced column of fluid continues in its movement through passages 112a and 111a into the valve bore section 73a and conduits 36a and 37a into the brake-operating pulsators 31a through 34a, causing expansion of these pulsators to take up slack in the brakes incident to causing an initial engagement of their friction surfaces. The pressure thus generated in the passage 105a beneath the valve plunger 74a is opposed by the spring 79a acting upon the small diameter upper end of this plunger. Attendant to the pedal pad 22a reaching the position Aa and the friction surfaces of the brakes being initially engaged, this manually created pressure in the brake fluid beneath the plunger 74a will have attained a magnitude correlated with the strength of the spring 79a to have shifted the plunger upwardly to the position illustrated in Fig. 6a. While the valve plunger was in the retracted position of Fig. 6, fluid expelled from a pump P into the conduit 104a was blocked by the valve plunger causing this fluid to return to a reservoir R through a by-pass valve V. When the valve reaches the position of Fig. 6a part of the fluid from the pump escapes past the plunger enlargement E for return to the reservoir through the conduit 101a, and part of the fluid delivered into the valve bore between lands E and 85a enters the left end of the cylinder 43a through the passage 95a. Continued depression of the pedal pad 22a increases the pressure beneath the valve plunger 74a to cause upward movement thereof to place the plunger land E above the annular port 94a, cutting off communication between this port and the reservoir return line 101a. The pressure fluid discharged through the passage 95a into the left end of cylinder 43a then becomes effective for advancing the piston 46a rightward against the force of the spring 51a for closing the cut-off valve 62a–108a and forcing the plunger 63a into the cylindrical compression chamber 41a to effect power compression of the brake fluid therein. Because of the closing of the cut-off valve 62a–108a the increased fluid pressure in the chamber 41a cannot be communicated backwardly through the ports 107a and passages 106a, 105a, and 35a to the master cylinder and thence to the brake pedal. During this time the operator will have advanced the brake pedal pad from position Aa to a position such as Ba and it will be recalled that the land E of the valve plunger is above the annular port 94a. Fluid continues to enter the left end of the cylinder 43a through the passage 95a to effect power compression of the brake fluid in the compressing chamber 41a discharging this fluid through the passages 112a and 111a to the brake pulsators to effect power application or engagement of the brakes 25a through 28a. Since the pressure in the valve plunger bore 73a increases while the manually applied pressure on the lower end of the larger diameter portion 85a of the valve plunger remains constant, the pressure in the chamber 41a and in the bore section 73a will quickly attain a magnitude for retracting the valve plunger 74a downwardly to a brake status maintaining position as that illustrated in Fig. 6a at which time enough fluid is allowed to escape from the port 94a past the land E into the reservoir conduit 101a to prevent additional delivery of fluid through the passage 95a into the compressing unit cylinder 43a. A dynamic fluid balancing condition prevails at this time making the control valve 53a have a sensitivity capable of quick response to any manual change of pressure on the lower end of the valve plunger for causing endwise movement of the plunger. While the valve is in the brake status maintaining position of Fig. 6a the brakes will remain engaged at a fixed braking effectiveness according to the amount of manual pressure being applied to the brake pedal. During downward retraction of the control valve plunger 74a the lower end of this plunger caused retractive displacement of the manually controlled fluid column in the conduit 35a into the master cylinder 24a causing slight retractive motion of the pedal pad from the position Ba to position Aa.

Intensity of braking is increased according to normal reaction by increasing pressure upon the brake pedal to advance the same toward position Ba and increase the volume of fluid beneath the valve plunger 74a incident to raising the same and throttling by means of the land E the escape of fluid to the reservoir by the conduit 101a and causing this fluid to flow through the passage 95a for further energizing the pressure creating unit attendant to forcing the plunger 63a farther into the pressure chamber 41a. This increased pressure is transmitted to the brake pulsators to cause the desired increased braking and as this pressure increases in the bore section 73a the valve plunger will be forced downwardly to cause return of the brake pedal pad to position Aa.

Selective diminution of brake pressure is accomplished by partly relaxing the manual pressure on the brake pedal to allow the downwardly urged valve plunger 74a to retract the fluid column in the conduit 35a and in the master cylinder 24a to shift the pedal pad upwardly from position Aa. The narrow valve plunger land E is thus caused to descend more nearly toward the position of Fig. 6a to cut off or at least throttle delivery of fluid from the pump into the cylinder 43a while permitting exhaust of fluid to the reservoir from such cylinder through the passages 95a and 101a. If the operator maintains the relaxed manual pressure upon the brake pedal, this pressure transmitted through the master cylinder and conduit 35a to the lower end of the valve plunger will ultimately prevail over the decreasing pressure in the pressure chamber 41a and the bore 73a intercommunicative therewith so the pedal pad will advance to the position Aa while moving the plunger upwardly to the Fig. 6a position where the dynamic balance of this plunger will be reestablished.

Complete release of the brakes is accomplished by releasing the brake pedal which permits the spring 79a and the fluid pressure in the valve bore section 73a to return the valve plunger against the stop 78a as shown in Fig. 6. Fluid pressure in the chamber 41a and the spring 51a promptly retract the plunger 63a and the piston 46a incident to discharging fluid from the cylinder 43a through the passage 95a, port 94a and the conduit 101a to the reservoir. The pump P then commences discharge past the by-pass valve V and the other parts assume the position shown in Fig. 6 in readiness to commence a new cycle of operation attendant to engagement of the brakes.

In the second form of the invention, as in the first form, much of brake fluid displacement is handled by the master cylinder 24a in filling the brake lines and brake operating pulsators. This leaves but a portion of the brake operating fluid to be displaced by the power operated fluid compressing unit. Consequently, the bore of the pressure chamber 41a can be made very small without at the same time making it necessary for this chamber to accommodate a long stroke of the plunger 63a therein. It has been found in actual practice that the diameter of the pressure chamber 41a can be three-eighths inch in diameter and provide sufficient fluid displacement capacity with a plunger moving three inches therein. With a pressure chamber of these dimensions the plunger can be effectively operated for creating the maximum required brake line pressure of 1400 lbs. per sq. in. by a piston as 46a, four and one-half inches in diameter, when subjected to pressure differential obtainable from the atmosphere and the diminished pressure source of an engine intake manifold. When the piston 46a is operated by oil pressure as from a pump P the diameter thereof can be diminished according to the pressure available from the pump. It will be realized therefore, that even when the fluid compressing unit is energized from the relatively small pressure differential between the atmosphere and the intake manifold of an engine, the pressure booster or compressing unit can be made exceedingly small.

The manually controlled pressure phase of the system including the master cylinder continues to supply the fluid for taking up the additional slack in the brake lines and brake operating pulsators when such slack increases because of wear of the brake friction elements. The master cylinder is operated in substantially conventional manner until enough brake line pressure is generated thereby for operating the control valve plunger 74a (or 74 in the first embodiment) to cause power energization of the fluid compressing unit and closing of the cut-off valve for communicatively isolating the manually created pressure portion of the system from the power created pressure portion thereof.

The feature of the brake pedal pad being returned to the position Aa during operation of the brakes makes it practical for this pedal pad to have a short range of operating movement. If the pedal pad should continue to be depressed according to increments of brake engaging intensity, the pedal pad 22a (or 22 in the first embodiment) would approach so nearly to the toe board of the driver's compartment that insufficient reserve space would remain for brake friction element wear or expansion of brake drums when heated by a series of severe brake engagements that might be incurred in mountain driving.

In each of these embodiments the amount of brake wear is detectable as in conventional systems because the master cylinder plunger will be moved farther to take up the slack in the fluid lines and friction elements of the brakes to correspondingly advance the position Aa where power braking commences. So long, however, as the position Aa remains above the toe board of the vehicle the operator will be able to control power braking since very little additional movement between positions Aa and Ba is required.

The following tabulation shows significant conditions prevailing at the time of inital friction element engagement and again attendant to attainment of maximum braking, in typical apparatus constructed according to this invention, wherein the ratio of pedal pad movement to master cylinder plunger movement is 4.75 to 1, the master cylinder plunger is one inch in diameter, and the ratio of the large area end of the control valve plunger to the small area end of such plunger is 3.46 to 1.

|  | Status Attendant to Establishing Initial Friction Element Engagement | Status Attendant to Establishing Maximum Braking | Status for Typical Conventional Master Cyl. installation Attendant to Establishing Max. Braking |
|---|---|---|---|
| Pedal Pad Advancement___in__ | 1.58 | 1.58 | 4.48 |
| Pedal Pad Pressure_____lbs__ | 25 | 80 | 200 |
| Brake Line Pressure lbs. per sq. in__ | 120 | 1310 | 1310 |
| Vol. of Fluid From Master Cyl cu. in__ | .261 | .261 | .547 |
| Vol. of Fluid Forced Into Brake Lines By Fluid Compressing Unit_____cu. in__ |  | .286 |  |

From the above tabulation it is ascertainable that the pedal pad normally advances only 1.58 inches which is the range of movement between the relaxed full line position of the pedal pad 22 and the position A in Fig. 1 of the drawings. This contrasts to 4.48 inches of pedal pad travel to attain maximum braking action in a conventional hydraulic braking system. In the improved system upon which all but the last vertical column of the above table is based, 25 lb. foot pressure is required to force fluid from the master cylinder into the brake lines for filling the same incident to creating 120 lb. line pressure. An 80 lb. foot pressure will establish 1310 lbs. per sq. in. line pressure to attain maximum braking. .261 cu. in. of fluid is required from the master cylinder to attain the initial friction element engaging pressure of 120 lbs. and this quantity of fluid from the master cylinder stays in the fluid lines while an increased foot pedal pressure up to 80 lbs. causes manipulation of the control valve 53 to energize the fluid compressing unit 42 and cause .286 cu. in. of fluid to be forced into the brake lines by the power operated plunger 63 in the pressure chamber 41. While the .286 cu. in. of fluid is being forced into the brake lines by the power compressing unit the .261 cu. in. initially forced into the lines from the master cylinder does not increase as can be seen by reference to the center vertical column of the table titled "Status attendant to establishing maximum braking." Consequently, the brake pedal pad need not advance excepting for the negligable movement from the position A to position B during attainment of any selected brake intensity. It follows no substantially extra range of movement for the pedal pad beyond the position B is necessary, and this is why the entire range of movement for the pedal pad can be limited to about three inches.

If it were not for the master cylinder supplying the .261 cu. in. of fluid for the brake lines the compressing unit 42 would need to supply this quantity of fluid in addition to the .286 cu. in. and that would correspondingly increase the necessary size, cost and space factor of the fluid compressing unit.

The third vertical column of the above table indicates that in a conventional hydraulic braking system the pedal pad in traveling 4.48 in. to attain maximum braking must receive a 200 lb. pressure and displace .547 cu. in. of fluid into the brake lines for creating the same line pressure as in the improved system, namely 1310 lb. per sq. in. In the typical conventional hydraulic braking system constituting the basis for colum three of the above tabulation, whether the master cylinder plunger is advanced manually or by a pressure booster unit, the brake pedal pad moves an amount correlated with the amount of movement in the master cylinder plunger and therefore has a normal operating range of 4.48 inches.

Either embodiment of the invention is capable of effecting manual operation of the brakes in the event of failure of the energizing source for the fluid compressing unit. Should such failure occur, the booster piston would not be advanced and the cut-off valve 62a–108a (or 62–108 of the first embodiment) would not close, whereby continued pressure upon the brake pedal would cause the master cylinder to conventionally operate the brakes.

Having thus described a limited number of embodiments of the invention with the view of clearly and concisely illustrating the same,

I claim:

1. In a braking system adapted to utilize power from a fluid source for engaging fluid-operated brakes, a pressure booster unit energizable from said source and having a pressure chamber communicative with the brakes to cause engagement thereof with a force according to the pressure in such chamber, a master cylinder, means including a cut-off valve communicative between the master cylinder and the brakes, a pressure-operable control unit including a casing structure having a bore with axially spaced sections of relatively small and large diameter and a plunger in said bore having axially spaced relatively small and large diameter sections respectively in said bore sections, the small diameter bore section being communicative with the pressure chamber, the large diameter bore section being communicative with the master cylinder whereby the pressure of fluid in the pressure chamber and in the master cylinder act oppositely upon the plunger for urging it in opposite axial directions, control valve means operated by said control unit and interposed between said source and the booster unit, said control valve means being operable by the control unit to vent the booster unit when the control unit plunger is displaced from an intermediate position toward the large diameter bore section into a booster de-energizing position, means yieldably biasing the plunger into the booster de-energizing position, the control valve means being operable by the control unit to establish communication between the source and the booster unit when the plunger is displaced from the intermediate position toward the small diameter bore section into a booster energizing position, the control valve being operable for maintaining the booster unit energization status when the plunger occupies said intermediate position, the master cylinder being operable through the communication thereof with the brakes for displacing fluid thereinto to take up the slack therein incident to creating an initial pressure in the large diameter bore section to displace the plunger into the booster energizing position against the force of the biasing means to energize the booster unit and increase the pressure in the pressure chamber, said cut-off valve being operated responsive to energization of the booster to terminate communication between the master cylinder and the brakes, and the booster unit being operable under the influence of the source fluid to increase the pressure in the pressure chamber and hence in the small diameter bore to a magnitude prevailing over the master cylinder pressure in the large diameter bore section for moving the plunger to the intermediate position.

2. In a braking system adapted to utilize power from an energy source for engaging fluid-operated brakes, a fluid compressing unit having a pressure chamber communicative with the brakes to cause engagement thereof with a force according to the pressure in such chamber, a master cylinder, means including a cut-off valve for establishing communication between the master cylinder and the brakes, a pressure operated control unit for controlling energization of the compressing unit from said source, said control unit including casing structure having a bore with axially spaced sections of relatively small and large diameter and a plunger in said bore having axially spaced relatively small and large diameter sections respectively in said bore sections, the small diameter bore section being communicative with the pressure chamber, the large diameter bore section being communicative with the master cylinder whereby the pressure of fluid in the compressing unit chamber and in the master cylinder act oppositely upon the plunger for urging it in opposite axial directions, said control unit being operable to cause de-energization of the fluid compressing unit when the plunger is displaced from an intermediate position toward the large diameter bore section into a compressing unit de-energization position, means biasing the plunger into said compressing unit de-energization position, said control unit being operable to cause energization of the compressing unit when the plunger is displaced from the intermediate position toward the small diameter bore section into a compressing unit energizing position, the control unit being operable for maintaining the compressing unit energization status when the plunger occupies said intermediate position, the master cylinder being operable through the communication thereof with the brakes for displacing fluid into such brakes to take up the slack therein incident to creating an initial pressure in the large diameter bore section to displace the plunger into the compressing unit energizing position against the force of the biasing means to energize the compressing unit and initiate an increase of pressure in said chamber, the cut-off valve being operated responsive to energization of the compressing unit to terminate communication between the master cylinder and the brakes, the pressure of the fluid being increased in said chamber and hence in the small diameter bore increasing in pressure to a magnitude prevailing over the master cylinder pressure in the large diameter bore section for retracting the plunger to the intermediate position.

3. In a braking system adapted to utilize power from an energy source for engaging brakes operated by fluid pressure, a master cylinder, fluid conducting means including a stationary cut-off valve providing communication between the master cylinder and the brakes, a fluid compressing unit operable by energy from said source to impose fluid pressure on the brakes to incur power engagement thereof, the master cylinder including a plunger manually advanceable to supply through the fluid conducting means a "slack-take-up" quantity of fluid for the brakes increasing the pressure thereon to a magnitude causing initial engagement thereof, a pressure-operated control unit subjected to the fluid pressure in the master cylinder and operable independently of the fluid compressing unit and responsive to such increased pressure to energize the fluid compressing unit from said source, means for closing the cut-off valve to terminate communication between the master cylinder and the brakes attendant to power engagement of the brakes by the energized compressing unit, fluid conducting means communicating between the fluid compressing unit and said control unit to subject such control unit to the fluid pressure imposed on the brakes by the compression unit and said control unit being operable independently of the fluid compressing unit and jointly by such pressure and by the master cylinder pressure to control energization of the compressing unit for causing power engagement of the brakes in accordance with manually selected master cylinder pressure, and said control unit including means through which the brake pressure fluid reacts on the master cylinder fluid to create unit pressure therein corresponding to that of the brake pressure fluid but of less magnitude to produce a reaction pressure through the master cylinder manifesting degree of brake engagement to the operator.

4. The combination set forth in claim 3, wherein the fluid compressing unit comprises a fluid compressing chamber constituting a section of said fluid conducting means for providing communication between the master cylinder and the brakes, said fluid compressing unit also including a power-operated plunger advanceable in said fluid compressing chamber for compressing the fluid therein to cause power engagement of the brakes, and wherein said cut-off valve comprises a fluid conducting component in the communication between the master cylinder and the fluid compressing chamber while the plunger is retracted, and the plunger constituting a second component of the cut-off valve and being adapted to block communication of the fluid conducting component and consequently of the master cylinder with the fluid compressing portion of the chamber incident to advancement of the plunger past said fluid conducting component.

5. In a braking system adapted to utilize power from an energy source for engaging brakes operated by fluid pressure, a master cylinder including a brake pedal and operable to advancively expel fluid from the master cylinder attendant to advancement of such pedal, a fluid compressing unit communicative with the brakes and operable by energy from said source to impose pressure of brake fluid through such communication onto the brakes to incur power engagement thereof, a pressure operated control unit operable to control energization of the fluid compressing unit from said source, said control unit including a stepped bore having axially spaced sections of relatively large and small diameter, a plunger moveable axially in said bore and having relatively large and small diameter sections respectively in the large and small diameter bore sections, said plunger being advanceable toward the small diameter section and being retractable toward the large diameter section, means providing communication between the master cylinder and the large diameter bore section for advancively conducting the expelled fluid thereinto from the master cylinder for acting upon the large diameter end of the plunger for urging the plunger advancively, means providing communication between said communication with the brakes and the small diameter section of the bore for exerting fluid pressure upon the small diameter end of the plunger to urge this plunger retractively with a force proportional to the hydraulic pressure imposed upon the brakes by the fluid compressing unit, spring means acting upon the plunger to supplement the force of the brake fluid thereon, the plunger being operable when advanced by advancive movement of the fluid in the communication with the master cylinder to cause energization of the fluid compressing unit for increasing the brake fluid pressure responsive to advancement of said brake pedal from a power controlling position by a force applied manually to the brake pedal, and the ensuing increase of pressure in the communication with the brakes and in said small diameter bore section being operable to increase the pressure in such small diameter bore section to supplement the spring pressure for retracting the plunger to a position for precluding further energization of the fluid compressing unit, and such retraction of the plunger being operable to retract said expelled fluid for returning the brake pedal substantially to the controlling position concurrently with precluding further energization of the fluid compressing unit.

6. In a braking system adapted to utilize power from an energy source for engaging brakes operated by fluid pressure, a master cylinder, a fluid compressing unit operable by energy from said source to impose fluid pressure on the brakes to incur power engagement thereof, pressure responsive means for controlling energization of the fluid compressing unit, a fluid column containing line communicating between the pressure responsive controlling means, the brakes and the master cylinder and wherein said fluid column therein is advanceable from the master cylinder to the brakes, and also to such controlling means to operate the latter to cause energization of the fluid compressing unit, a stationary cut-off valve part in the line between the master cylinder and the brakes, a cooperating movable valve part in the compressing unit operative when the compressing unit is energized to close communication between the master cylinder and the brakes while the compressing unit continues effective to advance the fluid column to the brakes, a second fluid column containing line communicative between the brakes and said pressure responsive controlling means and wherein the second fluid column therein is advanceable from the brakes into such controlling means to operate the same for precluding further energization of the fluid compressing unit attendant to an increase of pressure upon the brakes attained by such energization of the compressing unit, and said controlling means including means operable responsively to advance of the second fluid column for retracting at least a portion of the first column into the master cylinder.

7. In a braking system adapted to utilize power from an energy source for engaging brakes operated by fluid pressure, a master cylinder, fluid conducting means including a cut-off valve providing communication between the master cylinder and the brakes, a fluid compressing unit operable by energy from said source to impose fluid pressure on the brakes to incur power engagement thereof, the master cylinder including a plunger manually advanceable to supply through the fluid conducting means a "slack-take-up" quantity of fluid for the brakes increasing the pressure thereon to a magnitude causing initial engagement thereof, a pressure-operated control unit subjected to the fluid pressure in the master cylinder and operable independently of the fluid compressing unit and responsive to such increased pressure to enrgize the fluid compressing unit from said source, means for closing the cut-off valve to terminate communication between the master cylinder and the brakes attendant to power engagement of the brakes by the energized compressing unit, fluid conducting means communicating between the fluid compressing unit and said control unit to subject such control unit to the fluid pressure imposed on the brakes by the compressing unit and said control unit being operable independently of the fluid compressing unit and jointly by such pressure and by the master cylinder pressure to control energization of the compressing unit for causing power engagement of the brakes in accordance with manually selected master cylinder pressure, and said control unit including means through which the brake pressure fluid reacts on the master cylinder fluid to create unit pressure therein corresponding to that of the brake pressure fluid but of less magnitude to produce a reaction pressure through the master cylinder manifesting degree of brake engagement to the operator, said fluid compressing unit comprising a chamber constituting a section of said fluid conducting means that provides communication between the master cylinder and the brakes, said fluid compressing unit also including a power-operated plunger alternately advanceable in said chamber for compressing the fluid therein to cause power engagement of the brakes and retractable outwardly through an open end of said chamber, and wherein a circumferential interior portion adjacent to the open end of said chamber constitutes a first component of said cut-off valve and said plunger comprises a second component of the valve complemental with the first component, the valve being open when the plunger is retracted with respect to the first valve component and being closed pursuant to advancement of the plunger into registry therewith inwardly of the chamber.

8. For combination with a hydraulic brake system which includes a master cylinder, manually-operable means operatively connected with the master cylinder for operating the same, wheel brake units and conduit means interconnecting the master cylinder in fluid pressure-responsive relationship with the brake units, manually controlled power braking means comprising in combination, a power unit interconnected in series relationship in said conduit means having passageways therein including a pressure cylinder providing a path in series in said conduit means for the flow of brake fluid from said master cylinder to said brake units and comprising power means for forcing a plunger member through a seal into said pressure cylinder so as temporarily to sever said path and pressurize brake fluid therein in communication with said brake units, and control valve means for said power means for controllably actuating the same and being interconnected in direct hydraulic pressure-responsive relationship with both said master cylinder and said pressure cylinder, said power means remaining inactive until the hydraulic pressure in the system rises to a predetermined value whereupon said power means is actuated to force said plunger member into said pressure cylinder and pressurize the hydraulic fluid therein in proportion to increases in pressure developed by said master cylinder.

9. For combination with a hydraulic brake system which includes a master cylinder, manually-operable means operatively connected with the master cylinder for operating the same, wheel brake units and conduit means interconnecting the master cylinder in fluid pressure-responsive relationship with the brake units, power braking means comprising, in combination, a power unit interconnected in series relationship in said conduit means having passageways therein including a pressure cylinder providing a path in series in said conduit means for the flow of brake fluid between said master cylinder and said brake units and comprising air-operated power means having a projecting plunger member positioned to be forced into said pressure cylinder through an entrance seal so as temporarily to sever said path and pressurize brake fluid therein in communication with said brake units, and a hydraulically-operated control valve for said power means for alternately admitting and discharging actuating air pressure thereto and being interconnected in direct hydraulic pressure-responsive relationship with said master cylinder and with said pressure cylinder and sensitive to the differential in pressure therebetween, said control valve operating to actuate said power means whenever the hydraulic pressure in said system reaches a predetermined value whereupon hydraulic fluid in said pressure cylinder is pressurized by said plunger member in proportion to the pressure created by said master cylinder.

10. The combination called for in claim 9 wherein said pressure cylinder, plunger, power-actuating means and control means for said power-actuating means are combined into a single unit.

11. The combination called for in claim 9 wherein said plunger and said power-actuating means therefor comprise an air cylinder unit the piston rod of which projects therefrom and constitutes said plunger.

12. For combination with a hydraulic brake system including a master cylinder, manually-operable means operatively connected with the master cylinder for actuating the same, wheel brakes and conduit means interconnecting the master cylinder in fluid pressure communication with the brakes, a manually-controlled, power-operated unit adapted to deliver braking pressures in response to substantially smaller pressures created by the master cylinder, comprising, a pressure cylinder having an entrance opening in one end thereof and having a discharge passageway removed from said entrance opening, said pressure cylinder being adapted to be interconnected in series in said conduit means with said entrance opening being connected with the master cylinder and with said discharge passageway being connected with the wheel brakes whereby when so interconnected the chamber of said pressure cylinder forms a portion of the fluid path between the master cylinder and the brakes, a plunger reciprocably mounted for entrance into and withdrawal from said pressure cylinder through said entrance opening therein, seal means disposed at said entrance opening to provide a fluid-tight seal around said plunger when it enters said cylinder, power-actuating means for said plunger operatively connected therewith for reciprocating the same, and control valve means for said power-actuating means interconnected in controlling relationship therewith, said control valve means being operable in response to the differentials in pressure between the pressure created by the master cylinder and the pressure within said pressure cylinder, said control valve means having two port openings one of which is adapted to be connected in fluid pressure communication with the master cylinder and means connecting the other port opening with said pressure cylinder.

References Cited in the file of this patent

UNITED STATES PATENTS

| | | |
|---|---|---|
| 2,275,697 | Stelzer | Mar. 10, 1942 |
| 2,289,043 | Rockwell | July 7, 1942 |
| 2,357,032 | Stelzer | Aug. 29, 1944 |
| 2,381,989 | Stelzer | Aug. 14, 1945 |
| 2,393,524 | Fant | Jan. 22, 1946 |
| 2,434,588 | Rockwell | Jan. 13, 1948 |
| 2,448,464 | Rockwell | Aug. 31, 1948 |